Jan. 9, 1968   W. I. SMITH   3,363,184
POWER SCAVENGING DEQ'ING CIRCUIT FOR A LINE-TYPE PULSER
Filed May 21, 1963
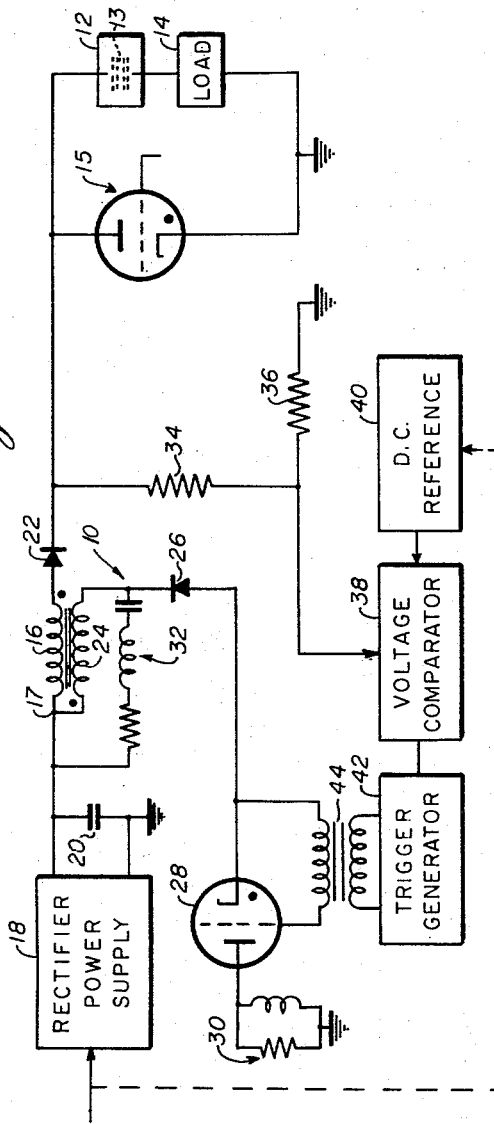
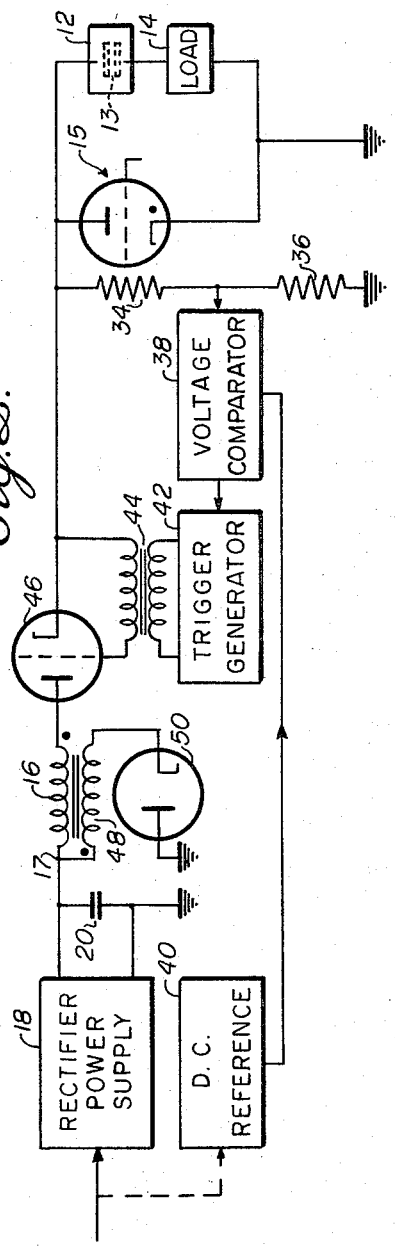
INVENTOR.
WILLIAM I. SMITH
BY
ATTORNEY United States Patent Office 3,363,184
Patented Jan. 9, 1968

3,363,184
POWER SCAVENGING DEQ'ING CIRCUIT FOR A LINE-TYPE PULSER
William I. Smith, Palmyra, N.J., assignor, by mesne assignments, to the United States of America as represented by the United States Atomic Energy Commission
Filed May 21, 1963, Ser. No. 282,182
8 Claims. (Cl. 328—65)

The invention disclosed herein was made under or in the course of contract No. AT(04-3)-363 with the United States Atomic Energy Commission.

The present invention relates generally to pulse regulating circuits and in particular to a power scavenging deQ'ing circuit capable of establishing a stable, peak charging voltage level for a pulse-forming network in a line-type pulser.

DeQ'ing, as herein defined, is the altering of a resonant charging circuit for a pulse-forming network to a condition of non-resonance. The "Q" of such a resonant charging circuit which normally includes a charging choke may be defined as the ratio of reactance to resistance at resonance. This ratio may be lowered by a change in operating conditions to reduce the reactance and attendant "Q" thereof which is commonly referred to as "deQ'ing." Therefore, a deQ'ing network is simply a circuit for cutting-off, at a known adjustable level, the voltage which is applied to the associated capacitance of a pulse-forming network by a charging power supply and a charging inductor or choke. The act of cutting-off the voltage results in a certain amount of excess energy being left in the choke, which tends to decrease the speed and accuracy of charging. An example of a deQ'ing circuit, used in conjunction with a pulse-forming network to provide voltage charging level regulation therefor, comprises essentially a gas tube serially connected with a resistor-capacitor (RC) network, the combination tube and RC network connected across the charging inductor of the pulse-forming network. In this deQ'ing circuit, the excess energy left in the charging inductor is dissipated by the RC network upon triggering of the tube, and results in significant power loss, and decreased circuit efficiency.

The present invention overcomes the above-noted shortcomings by providing a unique, power scavenging circuit in combination with a deQ'ing circuit, to establish a stable, peak chargng voltage level for a pulse-forming network (hereinafter termed PFN) in a line-type pulser. The power scavenging, de Q'ing circuit of the present invention provides charging voltage regulation without significant power loss, despite a varied power supply voltage or variations in the initial charge condition of the PFN. In linear accelerator circuits, or coherent radar transmitter system circuits, the added efficiency of the present invention in stabilizing the pulse voltage level without significant power loss is highly desirable.

Accordingly, it is an object of the present invention to provide a deQ'ing circuit for stabilizing the peak charging voltage of a pulse-forming network (PFN) with a minimum corrective response time delay and no significant charging power loss, under power supply voltage variations, or initial PFN charge variations.

It is another object of the present invention to provide a power scavenging deQ'ing circuit which utilizes an additional winding disposed in inductively coupled relation with the PFN charging choke winding.

It is still another object of the present invention to provide a deQ'ing circuit capable of scavenging the excess energy stored in the charging choke after a PFN charging cycle, and returning the power to the power supply to provide increased circuit efficiency.

It is a further object of the present invention to provide a power scavenging, deQ'ing circuit for use with either a gas tube, or hard tube, pulse-forming system.

Additional objects and advantages of the invention will become apparent from the following description and claims considered together with the acompanying drawing, of which:

FIGURE 1 is a schematic diagram of a power scavenging, deQ'ing circuit of the present invention as utilized in conjunction with a gas tube, pulse-forming network, and associated high voltage, D.C. power supply, and FIGURE 2 is a simplified, schematic diagram of a modified embodiment of the present invention, as utilized in conjunction with a vacuum tube pulse-forming system.

In accordance with the principle set forth by the present invention, means is provided whereby any excess energy stored in a charging inductor (choke) after charging an associated PFN, is scavenged and returned to the charging power supply. More particularly, an additional inductive winding is combined with the conventional winding of a charging choke, to form in essence, an inductively coupled, transformer-type device wherein the windings are connected together at one end and are spacially related so as to share any generated magnetic fields. The additional winding is connected across the output of the power supply, and in particular across an output filter capacitor of the power supply, through a suitable switch means such as a thyratron tube or a diode. Rendering the switch means conducting at a preselected time completes the circuit and provides a feedback path from the additional winding to the power supply filter capacitor. A voltage divider, D.C. voltage reference means, voltage comparator means and trigger generator means coact to define a charging voltage level, sensing means which operates the switch means to provide the feedback path.

More particularly, referring to the drawing, the power scavenging, deQ'ing circuit 10 of the present invention, is shown in conjunction with a pulse-forming network (PFN) 12 essentially represented by a capacitor 13 shown in phantom line therein, which PFN is connected to ground through a load 14. A suitable load switching means 15 such as, for example, a thyratron, having associated trigger circuitry (not shown) is connected in parallel with serially connected PFN 12 and load 14 to provide switch means for completing the discharge circuit. The PFN 12 is charged to the desired voltage level through a charging choke winding 16, which has connected to one end 17 thereof, a suitable, pulsed, D.C. voltage provided by a high voltage, rectifier power supply 18, which is fed in turn by a suitable A.C. supply. A power supply filter capacitor 20 is shown connected across the output of the high voltage supply 18, with one end thereof connected to ground. A holdoff diode 22 is serially inserted in the current path extending between the winding 16 and the PFN 12, with the anode of the diode 22 connected to the winding 16, and the cathode thereof connected to the PFN 12. One end of an additional coil winding 24 is connected to the end 17 of winding 16 and the free end of the winding 24 is connected to the cathode of a voltage standoff diode 26. The anode of diode 26 is connected in turn to the cathode of a suitable gas-filled tube 28, such as for example, a thyratron. The plate of the gas-filled tube 28 is connected to ground through a parallel combination of a resistor-coil 30. A transient damping, RCL network means 32, consisting more particularly of a serially connected resistor, capacitor, and coil, is connected from the common junction of winding 24 and diode 26, to the side 17 of winding 16.

A resistor 34 is connected to the common junction between the cathode of holdoff diode 22 and the PFN 12. The other end of resistor 34 is connected to ground through a second resistor 36, forming of resistors 34, 36 a voltage divider means. The common junction of resistors 34, 36 is connected in turn to the input of a voltage comparator means 38. A D.C. reference voltage means 40 supplies a preselected D.C. reference, voltage level to the voltage comparator means 38, wherein a comparison is made of the voltage introduced by the voltage divider means consisting of resistors 34, 36 and the preselected D.C. reference voltage introduced by the D.C. reference voltage means 40. The output of the voltage comparator means 38 is connected to the input of a trigger generator means 42, the output of which in turn is connected to the primary winding of a coupling transformer 44. The secondary of transformer 44 is connected across the grid and cathode of the gas-filled tube 28.

As in the operation of a conventional PFN circuit, some variation in the residual or initial PFN voltage may be evident due to random variations in modulator switch deionization time. As per conventional pulse-forming network principles, when the stored magnetic energy in the charging choke starts to collapse, a voltage and a sustained current in the choke is generated in series with the power supply, thereby charging the PFN to a voltage level above the original high voltage rectifier supply voltage level. At such time tube 28 is fired to clamp the voltage across coil 16 at a reduced value; thereafter a holdoff diode isolates the charged PFN circuitry, and the oscillatory action as well as the PFN charging action ceases. In a conventional, regulated PFN charging circuit, after the voltage across the choke falls to a value which makes the sum of the power supply voltage and the charging choke voltage less than the voltage to which the PFN is charged, charging ceases and any energy remaining in the choke is dissipated or otherwise lost as the field of the choke continues to collapse.

In keeping with the power scavenging principles set forth by the present invention the added winding 24 is wound to provide the polarity indicated in the drawing. At such time as the gas tube 28 is fired and the corresponding end of winding 24 is connected to ground or zero voltage through the cathode and plate of tube 28, the power supply voltage will appear across winding 24 in a direction which causes the remaining stored energy in the magnetic field of the combination winding 16, 24 to be, in essence, placed across and thereby returned to the power supply capacitor 20. If the ratio of winding 24 to choke winding 16 is proper, the voltage across winding 16 which is generated by the rectifier supply voltage across winding 24, is less than the voltage across the PFN 12 minus the voltage of the rectifier power supply. That is, the voltage generated across winding 16 resulting from the voltage across winding 24 is less than $V_N = V_b$; where $V_N$ is the voltage across the PFN 12, and $V_b$ is the voltage output of the D.C. rectifier power supply 18. Therefore, at such time as the gas tube 28 is triggered and rendered conducting, further charging of the PFN 12 ceases. Consequently, energy stored in the combination windings 16, 24 is returned to the rectifier power supply capacitor 20 prior to the beginning of the next charging cycle. The gas tube 28 deionizes during the discharging portion of the cycle, and is thus ready for a subsequent charging operation. Holdoff diode 22 isolates the charging circuit from the PFN 12 circuitry to prevent the discharge of the latter until the load switching means 15 is triggered and the stored energy in PFN 12 is discharged through the serially connected load 14.

At such time as the power supply voltage suddenly appears across the winding 16 at the start of each charging cycle, the RCL network means 32 connected across winding 24 damps any voltage transients which would be of sufficient value to cause tube 28 to break down. The voltage standoff diode 26 shares the inverse voltage with the gas tube 28 and assists the latter in sustaining the reverse voltage placed thereacross. Likewise, the parallel combination resistor-coil 30 acts as a current limiting means to reduce the current flowing through the gas-filled tube 28.

During collapse of the field of the coil 16 during a charging cycle, the voltage developed as a result of the collapse is relatively constant and slightly higher than the preselected voltage level desired across the PFN 12. The tube 28 is fired at the instant the PFN attains a charge sufficient to produce the preselected voltage level. Consequently, since the preselected voltage level will be attained only during a period of collapse of the field of the coil 16, the tube 28 will be fired at a time after the field starts to collapse, but before the field is completely collapsed. Thus, the tube 28 is fired relative to the voltage across the PFN, which firing may occur at any time during the collapse of the field of the coil 16. Resistors 34 and 36 operate as a voltage divider to provide a sample of the PFN 12 charging voltage, which sample is fed to the input of the voltage comparator means 38. At such time as the comparator means 38 determines that the value of charging voltage across the PFN 12 equals the value of the preselected D.C. reference voltage which is simultaneously being introduced thereto by the reference voltage means 40, comparator means 38 introduces a signal to the trigger generator means 42 and coupling transformer 44, to drive the gas tube 28 into conduction.

To provide for a controllable but stable charging voltage level on the pulse-forming network at such time as the voltage of the power supply 18 is varied, the reference signal introduced to the voltage comparator means 38 by the reference voltage means 40, is obtained from the input to the power supply 18 and varies proportionally therewith. Thus when the power supply voltage is changed to a different level, a proportional change is made in the reference voltage supplied to the comparator circuit means 38.

To further exemplify the operation of the power scavenging principle of the present invention, assume the case where the turns ratio of winding 24 to winding 16 equals 1.5 (winding 24 being larger). The secondary voltage of winding 24 exceeds $V_b$ whenever the primary voltage of winding 16 exceeds 0.67 $V_b$, or the network voltage exceeds 1.67 $V_b$. The voltage comparator means 38, and in particular the D.C. reference voltage means 40, may therefore be adjusted so that tube 28 fires at any given network voltage between 1.67 $V_b$ and 2 $V_b$ for idealized charging. When tube 28 fires, charging immediately ceases since the secondary voltage of winding 24 is clamped to $V_b$, and the primary voltage of winding 16 is clamped to 0.67 $V_b$. Simultaneously, the diode 22 prevents discharge of the PFN 12 to the power supply. At the instant that charging of the PFN 12 is stopped by firing the tube 28, the flux in the charging choke continues to collapse, but cannot cause further charging of the PFN 12 since the sum of the voltage across the winding 16 and the voltage across capacitor 20 is less than the voltage across the PFN( i.e., $V_b$ (across capacitor 20) + 0.67 $V_b$ (across winding 16) ≅ 1.67 $V_b$ to 2 $V_b$ (across PFN 12). Since the voltage across winding 16 is clamped at 0.67 $V_b$, current cannot flow to the higher potential of the PFN 12. The collapsing flux, therefore, generates a current only in the winding 24. This current flows by way of conducting tube 28 into the filter capacitor 20 against the relatively fixed power supply voltage. The current reduces linearly to zero in a fraction of one millisecond according to the rate $$\frac{di}{dt} = \frac{-V_b}{L_{24}}$$

where $L_{24}$ is the inductance of winding 24.

Referring to FIGURE 2, there is shown a modified embodiment of the circuit as set forth in the present invention. A high voltage, rectifier power supply 18, having a filter capacitor 20, is connected to the end 17 of the charging choke winding 16. The free end of choke winding 16 is connected to the positive electrode or plate of a suitable vacuum switch tube 46, e.g., a triode. The cathode of the tube 46 is connected in turn to the pulse-forming network (PFN) 12, and from thence to ground through the load 14. The load switching means 15 having suitable triggering circuitry (not shown) coupled thereto, is connected in electrical parallel across the serially connected PFN 12 and load 14. The resistor 34 is connected at one end to the cathode of tube 46 and at its other end to ground through the resistor 36, thereby forming a voltage dividing means of the resistors 34, 36. The common junction of resistors 34, 36 is connected to the input of the voltage comparator means 38. The output of the D.C. reference voltage means 40 is also connected to the input of the voltage comparator means 38. The output of voltage comparator means 38 is, in turn, connected to the input of the trigger generator means 42. The primary winding of the coupling transformer 44 is connected to the output of the trigger generator means 42, and the secondary winding thereof is connected across the grid and cathode of the vacuum tube 46.

One end of an additional coil winding 48 is connected to end 17 of the charging choke winding 16, and the other end is connected to the negative side, or cathode, of a diode 50. The positive side or plate of the diode 50 is connected to ground.

The modified circuit of FIGURE 2 operates on the same basic power scavenging principle set forth in the circuit of FIGURE 1. At such time as the charging cycle begins, tube 46 is biased sufficiently positive to allow conduction therethrough, causing the PFN 12 to charge, in conventional manner, to a voltage level higher than the voltage level of the rectifier power supply 18. Thereupon, the tube 46 is cut off by application of a suitable trigger signal to the grid thereof; such signal originating by way of the voltage divider means (resistors 34, 36), voltage comparator means 38, trigger generator means 42, and transformer 44, as heretofore described in conjunction with the circuit of FIG. 1.

The instant that tube 46 is driven non-conducting, current flow is generated in the additional winding 48 which is inductively coupled to choke winding 16. The windings 16, 48 are wound to provide the polarity shown by the dots on FIGURE 2, and thus cause the generation of current having a polarity which renders the diode 50 conducting. The current flowing through diode 50 is essentially, serially connected to the power supply capacitor 20. Thus, energy stored in the choke winding 16, which would generally be dissipated or otherwise lost, is returned to the power supply 18 to provide a greater degree of charging circuit efficiency. During the PFN 12 charging period, the polarity and voltage stand-off characteristics of the signal seen by diode 50 is such as to prevent any flow of current therethrough.

As in the circuit of FIG. 1, an RCL network may be connected across the winding 48 to damp the transients generated when the power supply voltage suddenly appears across the inductively coupled choke winding 16 at the start of the charging cycle. Likewise, voltage stand-off means may be placed in series with diode 50 to share the inverse voltage appearing thereacross.

While the invention has been disclosed with respect to several embodiments, it will be apparent to those skilled in the art that numerous variations and modifications may be made within the spirit and scope of the invention, and thus it is not intended to limit the invention except as defined in the following claims.

What is claimed is:

1. A "Q"-reducing circuit comprising a pulse-forming network, a charging inductor forming a series-resonance network with said pulse-forming network, said charging inductor further acting as a primary winding of a transformer, a source of current to said charging inductor and said pulse-forming network, switch means across said charging inductor, said switch means including an electron tube having a control electrode, a second inductor acting as the secondary winding of said transformer in series with said charging inductor and said electron tube, a storage capacitor connected to the positive side of said second inductor, said electron tube connected to the negative side thereof, feedback means from said pulse-forming network for initiating operation of said electron tube, said feedback means including a voltage divider network connected to said pulse-forming network for monitoring the voltage thereon, a voltage discriminator and pulse amplifier comparison network for providing a reference voltage and comparing said reference voltage with the monitor signal voltage from said voltage divider, said comparison network feeding a signal to the control electrode and said electron tube when said monitor signal voltage exceeds said reference voltage thereby initiating operation of said electron tube closing said switch thereby causing the energy stored in said charging inductor to be coupled through said second inductor and onto said storage capacitor.

2. A power scavenging deQ'ing circuit for use with a pulse forming network, including a power supply, a capacitor connected across the output of the power supply, and a charging choke having first and second ends, the first end being connected to the output of said power supply, and the second end being connected to said pulse forming network for supplying a flow of charging current thereto from said power supply, together with said capacitor to charge said network to a predetermined voltage level; said deQ'ring circuit comprising:

(a) inductive coil means connected to the first end of said charging choke and inductively coupled to the choke; and (b) circuit means including a switch tube in series with said inductive coil means, and a charging voltage level sensing means electrically coupled to said switch tube for sensing the predetermined voltage level attained by said pulse forming network, said switch tube operable for electrically coupling said inductive coil means to said capacitor in response to said sensing means sensing the predetermined voltage level.

3. A power scavenging deQ'ing circuit for use in combination with a power supply, a capacitor connected across the output of said power supply, a pulse forming network, and a charging choke having first and second ends, the first end being connected to the output of said power supply and the second end being connected to said pulse-forming network for supplying a flow of charging current thereto from said power supply, together with said capacitor to charge said network to a predetermined voltage level, said deQ'ing circuit comprising:

(a) a coil means inductively coupled to said charging choke for scavenging power therefrom upon cessation of the flow of charging current therethrough;

(b) switch means for connecting said coil means to said capacitor; and (c) voltage level sensing means connected from said pulse-forming network to said switch means to sense attainment of the predetermined level of the pulse-forming network voltage and actuate said switch means to operate the latter to connect said coil means to said capacitor.

4. A power scavenging deQ'ing circuit according to claim 3, wherein said coil means comprises a coil winding having first and second ends, the first end of said coil winding being connected to the first end of said charging choke, and the second end of said coil winding being connected to said switch means, said coil winding being wound in inductively coupled relation with said charging choke and in opposed polarity relation thereto.

5. A power scavenging deQ'ing circuit according to claim 3, wherein said switch means comprises a tube having an anode and cathode connected in series with said coil means across said capacitor, and a grid electrode connected to said voltage level sensing means.

6. A power scavening deQ'ing circuit for use with a power supply, a capacitor connected across the output of said power supply, with one side connected to ground, a pulse-forming network, and a charging, choke having first and second ends, said first end being connected to the output of said power supply, and said second end being connected to said pulse-forming network for supplying a flow of charging current thereto from said power supply, together with said capacitor to charge said network to a predetermined voltage level, said deQ'ing circuit comprising:

(a) a coil winding having first and second ends, said first end being connected to the first end of said charging choke, said coil winding being wound in inductively coupled spatial relation with said charging choke;

(b) a gas-filled tube means having a cathode, grid and anode, said cathode being connected to said second end of said coil winding, and said anode being connected to ground; and (c) charging voltage level sensing means including a voltage divider and a DC reference voltage means, said sensing means being connected from said pulse-forming network to said grid electrode, said voltage divider to sense the voltage across said pulse-forming network, said sensing means to trigger said grid at such time as the network is charged to a voltage level such that the voltage sample exceeds the voltage from said DC reference voltage means, whereby said tube is rendered conductive to provide a continuous path from said coil winding to said capacitor.

7. A power scavening deQ'ing circuit according to claim 6, and further comprising:

(a) an RCL network serially connected across the termials of said coil winding; and (b) a standoff diode having the anode thereof connected to the cathode of said gas-filled tube and the cathode thereof connected to the second end of said coil winding.

8. A "Q"-reducing circuit for a pulse-forming network comprising a pulse-forming network, a charging inductor forming a series-resonance network with said pulse-forming network, a source of charging current to said charging inductor and said pulse-forming network, switch means across said charging inductor, means for removing the current stored in said charging inductor, feedback means for feeding back from said pulse-forming network to said switch a signal for closing said switch at a predetermined amplitude of charge on said pulse-forming network thereby shunting said current stored in said charging inductor to said removing means thereby removing said charge source from said pulse-forming network to control the voltage amplitude thereof, said removal means includes a second inductor, said charging inductor and said second inductor forming a transformer, a storage capacitor connected to the positive side of said second inductor, said switch means connected to the negative side thereof such that when said switch is closed the energy stored in said charging inductor will be coupled through said second inductor to said storage capacitor.

References Cited

UNITED STATES PATENTS

| 3,119,968 | 1/1964 | Schonberg | 328—67 |
| 3,127,573 | 3/1964 | Weil | 307—107 X |

JOHN S. HEYMAN, *Primary Examiner.*

MILTON O. HIRSHFIELD, ARTHUR GAUSS,
*Examiners.*